May 14, 1963 V. T. SHAHAN 3,090,037

MAGNETIC MEMORY

Filed June 21, 1961

INVENTOR
VICTOR T. SHAHAN
BY [signature]
ATTORNEY 3,090,037
MAGNETIC MEMORY

Victor T. Shahan, Wappingers Falls, N.Y., assignor to International Business Machines Corporation, New York, N.Y., a corporation of New York Filed June 21, 1961, Ser. No. 118,729
13 Claims. (Cl. 340—174)

This invention relates to a magnetic memory, and more particularly to a method of, and means for constructing a non-coincident current, coincident selection memory.

Thin magnetic films have received increasing attention during the past few years as prospective computer components. The decrease in total magnetizing energy with decreasing thickness and volume and corresponding reduction of eddy current losses as well as higher switching speeds attainable, are the primary factors which have led to the investigation of thin magnetic films. These thin magnetic films are layers of magnetic material deposited onto a substrate, and generally have a thickness of from 100–2000 A. The choice of thin magnetic films was originally motivated by higher switching speeds, the reduction of eddy currents, and the reduced magnetic energy corresponding to the small volume. The fact that cost reducing mass production techniques can be employed in the preparation of thin magnetic film circuits is an important advantage over the use of conventional magnetic units. Thin magnetic films may be produced in different ways, for example by evaporation in vacuum, by cathodes sputtering in a gaseous atmosphere, and by electroplating as discussed by T. D. Knorr, in Technical Report No. 3, September 1958, prepared by Pace Institute of Technology, Atomic Energy Division, and entitled "Geometric Dependence of Magnetic Anisotropy in Thin Ion Films." These films are produced to exhibit uniaxial magnetic anisotropy. By a uniaxial magnetic anisotropy, it is understood to mean that tendency of the magnetization all over the film to align itself along a preferred axis of magnetization. The preferred axis of magnetization is alternately referred to as the "easy axis," while a direction of magnetization perpendicular to the easy axis, is termed the "hard direction" of magnetization. Uniaxial anisotropy is generated, for example, by the evaporation of Permalloy material, preferably of the composition of 80% nickel and 20% iron, onto a heated substrate in the presence of a static magnetic field applied parallel to the plane of the substrate. During this process, the magnetic field induces the easy axis of magnetization. The results of such a fabrication is that the film, without any external fields, behaves similar to a single domain, i.e. all the magnetization vectors point to the same direction. Where, as discussed above, the film is said to exhibit uniaxial anisotropic characteristics, such a medium then exhibits a single axis along which the particular phenomena takes place, that is opposite remanent orientation states for magnetic flux. It is this characteristic of thin film elements made of magnetic material which is utilized to store binary information, in that, the opposite oriented stable remanent directions of flux are utilized to designate the different binary values 0 and 1.

A. V. Pohm et al., suggested the use of plane magnetic thin film elements exhibiting uniaxial anisotropy for a memory in an article entitled "A Compact Coincident-Current Memory," Proc. of the Eastern Joint Computer Conference, New York, N.Y., December 1956, pp. 120–124, and others, such as Eric E. Bittmann, in an article entitled "Using Thin Films in High-Speed Memories," appearing in Electronics, June 5, 1959; S. Methfessel et al., in an article entitled "Thin Magnetic Films," UNESCO, Proc. of the International Conference on Information Processing, Paris, June 15–20, 1959; and K. Raffel et al., in an article entitled "A Computer Using Magnetic Films," UNESCO, Proc. of the International Conference on Information Processing, Paris, June 15–20, 1959, also proposed the use of such uniaxial anisotropic magnetic thin film elements in coincident-current selection memories.

Recently, a non-coincident current, coincident selection memory, that is, a sequential current, coincident selection memory, employing magnetic elements exhibiting a biaxial anisotropic characteristic has been proposed in a copending application Serial No. 102,184, filed in behalf of Emerson W. Pugh, which application is assigned to the assignee of this application. What has been found is, that a sequential current, coincident selection memory may be fabricated by employing storage cells comprising a pair of magnetic elements exhibiting a uniaxial anisotropic characteristic. Basically, this memory comprises a plurality of storage cells arranged in columns and rows, wherein each such storage cell includes a first and a second magnetic thin film element exhibiting a uniaxial anisotropic characteristic. The first and second element of each storage cell is so arranged with respect to one another that their axes of easy magnetization are in alignment so that the remanent magnetization of the first applies a field to bias the second element of the cell. Actual storage of binary information is achieved by storing the information in the second element designated by the opposite remanent orientation states along the easy axis of the element. To write in a particular bit of information, the first element of the cell is magnetized to remanent orientation in the direction designating the binary value to be stored in the second element. The remanent magnetization of the first element then biases the second element. Thereafter, the second element has applied thereto a field tending to switch the second element in a direction of remanent magnetization assumed by the first element. The field applied to the second element coupled with the bias field applied by the first element is then of such magnitude as to jointly switch the second element to a remanent orientation state defining the binary information to be stored. Employing one magnetic element exhibiting a uniaxial anisotropic characteristic to bias another such element with a magnetic field has heretofore been contemplated, as for example, by L. A. Russell, in an article entitled "Non-Destructive Read for Thin Film Storage Device," appearing in the IBM Technical Disclosure Bulletin, Vol. 3, No. 6, for November 1960 on page 56; by W. Dietrich as described in copending application Serial No. 96,541, and somewhat similar to the type medium employed by C. G. Shook in an article entitled "A Digital Static Magnetic Wire Storage With Non-Destructive Readout," appearing in the IRE Transactions on Electronic Computers, Vol. EC–10, March 1961, pp. 56–62. Further, employing two magnetic thin film elements exhibiting uniaxial anisotropy per bit in a memory has also been proposed by L. J. Oakland et al., in an article entitled "Coincident-Current Non-Destructive Readout From Thin Magnetic Films," appearing in the JAP, Supp. to Vol. 30, No. 4, April 1959, pp. 54S–55S.

In any memory or logic system employing a plurality of uniaxial thin film elements in a given plane, in order to take full advantage of such elements, a close packing density is usually employed, however, the packing density of such elements in a particular plane, is limited by the amount of static magnetic field emanating from each element and coupling of adjacent elements. Where the stray field coupling from one element is to be employed to bias an adjacent element of the type described above, then the circuit arrangement and packing density becomes important since other elements in the plane may couple a particular storage element and cause deleterious switching. It has been found, that when employing the stray field coupling from one element to bias another element, a close packing density of the elements may be achieved by reducing the magnetization of the biasing element as close to a zero remanent flux magnetization state as possible, or, in effect, demagnetizing the element after the function to be achieved by use of such an element is accomplished. Thus, in the two element per bit circuit described above, after the storage element has been switched to the binary state to store a particular bit of information, the first element is then demagnetized to avoid any stray field coupling which may effect the storage element and cause undesirable switching thereof. By employing such a method, a plurality of such elements may be provided in a single plane with close packing densities.

It is a prime object of this invention to provide an improved sequential current, coincident selection, magnetic memory.

Another object of this invention is to provide an improved magnetic memory wherein each binary storage cell is coincidently selected by application of sequential current pulses and wherein each cell includes a pair of magnetic elements each exhibiting a uniaxial anisotropic characteristic.

Still another object of this invention is to provide an improved storage cell for storing binary information which includes a pair of magnetic elements each exhibiting a uniaxial anisotropic characteristic wherein the information is stored in one of said elements and controlled by the state of the other of said elements.

Another object of this invention is to provide a matrix of binary storage cells adapted to be selected by the conjoint application of an induced field and a stray field to allow coincident selection of a cell by application of sequential currents.

Another object of this invention is to provide an improved magnetic storage cell for storing binary information which includes a pair of magnetic elements each exhibiting a uniaxial anisotropic characteristic, wherein the stray field coupling from the first of said elements is employed to control the storage of information into the other of said elements and wherein the one element is thereafter demagnetized.

The foregoing and other objects, features and advantages of the invention will be apparent from the following more particular description of preferred embodiments of the invention, as illustrated in the accompanying drawings.

In the drawings:

FIG. 1 is a schematic representation of a binary storage cell in accordance with this invention.

FIGS. 2*a*–2*d* are representations of the operation of the binary storage cell of FIG. 1 in storing and reading out the different information retained therein.

Figure 1:
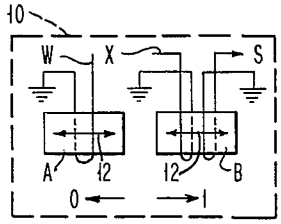

Referring to the FIG. 1, a binary storage cell 10 is shown comprising a pair of magnetic elements A and B, each of which comprises a thin film of magnetic material exhibiting a uniaxial anisotropic characteristic defining an easy axis of remanent flux orientation 12 for each of the elements A and B. As indicated by the double-headed arrow 12, the remanent flux orientation states in each of the elements A or B may be directed either to the left or to the right. Arbitrarily, the remanent orientation of flux within the elements A and B directed to the left is designated as the binary 0 state, while remanent orientation in the element A and B directed to the right is designated as the binary 1 state. The element A of cell 10 is coupled by a drive winding W while the element B of the cell 10 is coupled by a drive winding X and a sense winding S. In describing the operation for storage and read out of the information to be retained in the cell 10 reference will be made to the FIGS. 2*a*–2*d*.

Figure 2A:
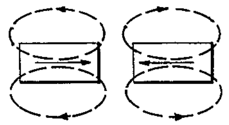
Figure 2B:

Referring to the FIG. 2*a*, assume the element B of cell 10 is in the binary 0 oriented stable state and that the winding W coupling the element A of cell 10 has been energized to orient the magnetization of the element A to the binary 1 stable state. The magnetization of the element A is then directed in opposite sense with respect to the magnetization of the element B. The element A then biases the element B with a field directed antiparallel to its remanent orientation direction, while similarly, the element B biases the element A with a stray field directed antiparallel to the remanent orientation direction of the element A. Assume the winding X coupling the element B is now energized to apply a field to the element B tending to switch the element B toward the binary 1 state. The magnitude of this field is controlled to be insufficient, in and of itself, to cause switching of the element B from stable orientation in the binary 0 state to stable orientation in the binary 1 state. The magnitude of the field applied by the energization of the X winding is sufficient, however, to cause the switching of the element B to the binary 1 state with conjoint application of the stray field applied to the element B by the magnetization state of the element A. Thus, the element A in FIG. 2*a* is switched to the binary 1 state to establish the elements A and B of the cell 10 in remanent orientation directions as is shown in the FIG. 2*b*. Conversely, if the element B of cell 10 is initially in the binary 1 orientation direction, the drive winding W of element A is energized to establish the element A in the binary 0 orientation direction. If the winding X coupling the element B is energized with a pulse of given magnitude and polarity to apply a field insufficient, of and by itself, to switch the element B of cell 10 to the binary 0 orientation direction, with the conjoint application of the bias field applied by the element A of the cell 10 by means of stray field coupling directed to switch the element B to the binary 0 state, the element B of cell 10 is switched to the binary 0 state. The elements A and B of cell 10 then assume the same orientation direction as is shown in the FIG. 2*d*. In accordance with this principle, coincident selection of a binary information storage cell 10 may be accomplished by employing sequential current inputs to a cell as is shown in the memory of FIG. 3.

Figure 3:
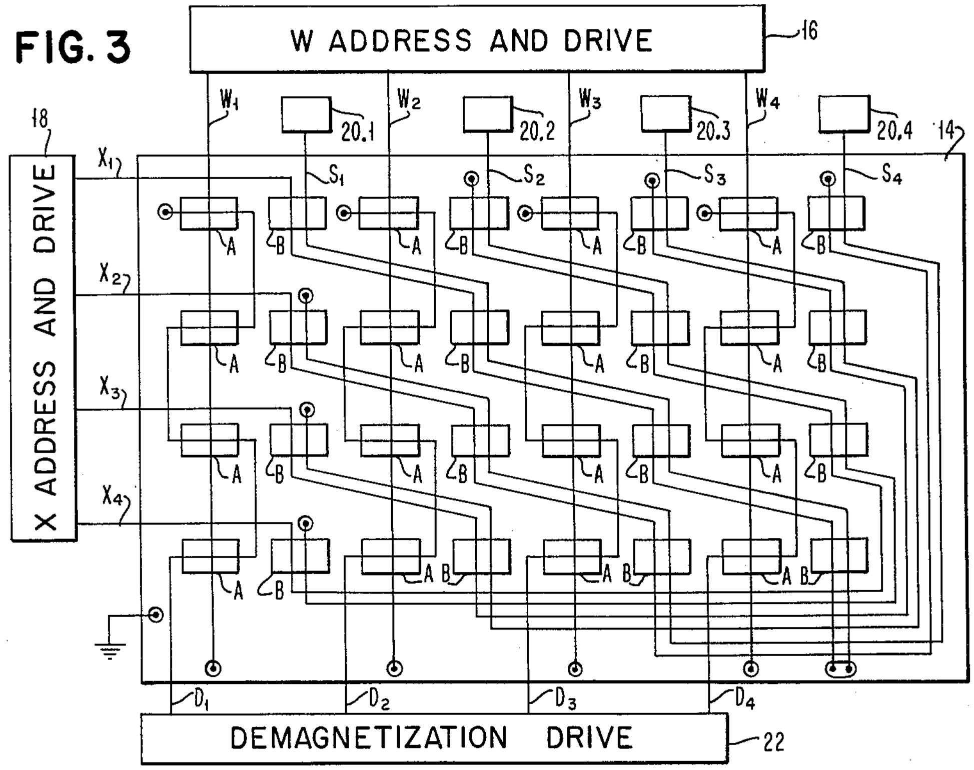
FIG. 3 is a representation of a magnetic memory employing the basic cell illustrated in FIG. 1.

Referring to the FIG. 3, there is shown a schematic illustration of a two dimensional word organized memory. The memory of FIG. 3 is provided with a plurality of storage cells 10 arranged in word columns and bit rows. Each column of cells 10 is coupled by each one of four word drive windings $W_1$–$W_4$, each of which is preferably a strip line conductor having one end connected to a grounded support member 14 and the other end connected to a word address and drive means 16. Each of the different rows of cells 10 is coupled by each one of four bit drive windings $X_1$–$X_4$, each of which is preferably a strip line conductor having one end connected to the ground member 14 and the other end connected to a bit address and drive means 18. Each row of cells 10 is further coupled by each one of four sense conductors $S_1$–$S_4$ in form of strip line conductors each having one end connected to the grounded member 14 and the other end connected to a respective load 20.1–20.4.

Figure 2C:
Figure 2D:
Figure 4:
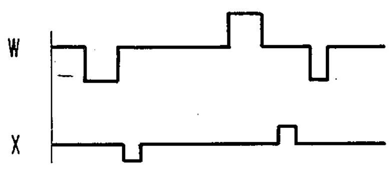
FIG. 4 is a representation of the pulse program for operation of the memory as set forth in FIG. 3.

Referring to the FIG. 4, a pulse program for energization of the different coordinate address lines W and X is shown for operation of the memory of FIG. 3. Referring to the FIGS. 3 and 4, a typical read-write cycle for reading out the information stored in a selected word and thereafter writing other information into this selected word will now be described in detail. Assume one word, corresponding to one column of storage cells 10, is to be selected for storing desired information. A selected one of the column drive windings $W_1$–$W_4$ is first energized by the address and drive means 16 to apply a negative polarity impulse to the selected one of the column drive windings $W_1$–$W_4$ which in turn applies a field directed to the left establishing all the coupled elements A of the cells 10 in the binary 0 orientation direction as is shown in FIG. 2*c*. Switching of an element A of a single cell by energization of the selected one of the column drive windings $W_1$–$W_4$ imposes a problem when a plurality of cells 10 is arranged in an array as set forth in FIG. 3 than operating on a single cell 10 as described in FIGS. 2*a*–2*d*. Consider for example all elements A of storage cells 10 coupled by drive winding $W_2$. Adjacent each of the column of A elements coupled by winding $W_2$ is an element B of a preceding cell 10 and the element B of the corresponding cell. The field applied to each element A by energization of winding $W_2$ must be large enough to overcome a bias which may be applied by both adjacent B elements both of which may bias the element A toward the binary 1 state. Further, this field applied to each element A of a selected column must be limited to insure that in overcoming the bias fields from adjacent B elements and the threshold of the A element itself, stray field coupling from the A element during application of the reverting field is not sufficient to switch an adjacent B element to the binary 0 state. As will become apparent subsequently, the same problem exists during the writing portion of the cycle, therefore this field along with the coupling field for biasing adjacent A and B elements must be closely controlled. Subsequently, a description of another structure for each cell 10 will be described which greatly alleviates the close tolerance problem described above. After each of the A elements coupled by a selected one of the column drive windings $W_1$–$W_4$ is established in the binary 0 state of remanent orientation, each of the bit drive lines $X_1$–$X_4$, is energized by the means 18 causing all the elements B of cells 10 corresponding to the selected word to be established in the binary 0 stable state as is shown in the FIG. 2*d*. Since the field applied by the bit drive lines $X_1$–$X_4$ to each of the elements B of each cell 10 is, in and of itself, insufficient to cause switching of any one element B to the binary 0 orientation stable state, the remaining elements B which are coupled are not effected and remain in their original stable orientation directions.

Information is thereafter written into the selected word by again energizing the selected one of the word column drive conductors $W_1$–$W_4$ which switches the elements A of each cell 10 coupled thereby to the binary 1 orientation stable state. Assuming all the B elements in the selected column of cells 10 are in the binary 0 state, immediately adjacent a corresponding A element of these cells a B element of an adjacent word bit may also be in a binary 0 state. The field applied by the selected column conductor W must again be closely regulated in order to overcome the bias fields applied by adjacent B elements to the A elements of the selected column without causing erroneous switching of an adjacent B element. Once the A elements of the selected column of cells 10 are established in the binary 1 state, the different bit drive conductors $X_1$–$X_4$ are selectively energized to provide a field to the element B of the cell 10 coupled which tends to switch the element B toward the binary 1 stable state. The conjoint application of the field applied by the selected bit drive conductor and the stray field coupling emanating from the element A of the selected cells 10 causes switching of the element B of the selected cells 10 in which binary 1 information is to be stored to the binary 1 stable state.

Although, it may be seen that binary information may be stored in each of the cells 10 in accordance with the principles of coincident selection by employing sequential current addressing, close packing density of each of the elements A and B and the storage cells 10 is necessary in order to achieve the additional advantage of compact memory arrays.

When employing the selection scheme as set forth above to a memory utilizing a storage cell 10 as herein provided, close packing density becomes a problem since each of the elements B of all words of the memory except the last word, is positioned adjacent the element A of the next word. If the elements A of adjacent words were allowed to remain in say the 0 or 1 orientation stable state, then the stray field coupling emanating from such elements would also interfere with the biasing field provided by the stray field coupling of the element A of the preceding word. Thus, the element A of say the first bit of the first word in the array of FIG. 3 could be in the 0 orientation stable state while the element A of the first bit of the second word could be in the 1 orientation stable state to cancel the stray field coupling required for switching the element B of the first bit of the first word. The opposite situation may also exist to cause deleterious switching of the element B without first orientating the elements A of the selected word. This difficulty is avoided, however, by demagnetization of the element A of each binary storage cell 10. This is achieved by applying a pulse to each of the A elements of the selected word after the particular writing operation has been accomplished which is of a magnitude and duration sufficient to apply a field great enough to overcome the coercive force threshold of the element A but insufficient to provide the volt-seconds capacity required to fully switch the element A to the 0 stable state.

The tolerance problem discussed above is alleviated by fabricating each cell 10 in the memory of FIG. 3 such that the element A is approximately two or three times the thickness of the element B. The element A will couple approximately two or three times the flux coupled by a corresponding B element and as such will magnetically bias the element B to a greater extent than the element B biases the element A. With each element A of all cells 10 in FIG. 3 fabricated in accordance to this latter technique, the stray field coupling the A elements by the adjacent B elements is very small, therefore the tolerance on the magnitude of the drive pulse applied to the selected column drive winding W is alleviated for switching of the A elements and for demagnetization.

Further, since each of the elements A and B of each storage cell 10 exhibits an easy axis of magnetization 12, in order to avoid difficulties in assuring that the A elements are substantially demagnetized after the writing cycle, a field may be applied to each A element of the memory which is directed transverse to the easy axis of the elements A which is of sufficient magnitude to rotate the magnetization of each A element 90° away from the easy axis, i.e. into the hard direction of the elements, so that upon collapse of this field approximately half the magnetic domains orient themselves in the binary 0 state while the remainder orient themselves in the binary 1 state, causing demagnetization of the A elements. This latter effect is fully described in a copending application Serial No. 12,987, assigned to the assignee of this application, and means for accomplishing this demagnetization may comprise a plurality of windings $D_1$–$D_4$ in the form of strip lines each of which couples all the A elements in a given column having one end connected to the grounded support member 14 while the other end is connected to a demagnetizing drive means 22. The upper magnitude of the transverse field applied to the elements A of the memory is not critical, therefore any tolerance problem encountered by utilizing the conductors $W_1$–$W_4$ for demagnetizing the A elements is obviated.

It should be realized, however, that while the elements A and B of a single storage cell 10 are shown as individual elements, the storage cell 10 may be constructed comprising a single film of magnetic material exhibiting an easy axis of magnetization. One portion of this film may then be employed to bias the other portion of the film, with the other portion employed to store the binary information as discussed above.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic memory comprising a plurality of binary storage cells arranged in word columns and bit rows having a plurality of column conductors each coupling all cells of a different column and a plurality of bit conductors each coupling all cells of a corresponding bit position in the different columns; each said cell comprising a first and a second planar magnetic element exhibiting a uniaxial anisotropic characteristic defining a first and a second stable state of remanent flux orientation along an easy axis of magnetization; the elements in each row of cells arranged side by side with their easy axes substantially in alignment so that a static field of one element in a remanent stable state couples the immediately adjacent elements in a row; first means for energizing one of said column conductors to establish all the first elements of the cells coupled in a predetermined one of said first and second stable states and thereby magnetically bias the second elements of the corresponding cells toward the predetermined one of said stable states; second means operative in non-time coincidence with said first means for thereafter energizing at least one of said bit conductors to apply a field to the second element of a selected cell magnetically biased, the second element of the selected cell responsive to the coincidence of said magnetic bias and said applied field to switch to the predetermined one of said stable states, said first means including other means thereafter operative to energize said one column conductor for demagnetizing all of the first elements of the cells coupled and thereby inhibit any magnetic bias from the first elements to the second elements of the corresponding cells and adjacent cells.

2. The memory as set forth in claim 1, wherein each said column conductor couples all the first elements of the cells in a corresponding column and each said bit conductor couples all the second elements of all cells of a corresponding bit position in the different columns wherein the corresponding bit position in one column is in one row of elements and the corresponding bit position in another column is in a different row of elements.

3. The memory as set forth in claim 2, wherein the magnetic material thickness of the first element of each cell is relatively greater than that of the second element.

4. In a circuit comprising a plurality of storage cells arranged side by side in a given plane wherein each said cell comprises a first and a second planar element made of ferromagnetic material and exhibits a uniaxial anisotropic characteristic defining a first and a second stable state of remanent flux orientation along an easy axis of magnetization, said elements arranged side by side with their easy axes substantially in alignment so that a static field of one element in a remanent stable state couples adjacent elements, means for storing a binary bit of information into a selected one of said cells comprising, first means for establishing the first element of the selected cell in a predetermined one of said first and second stable states to thereby magnetically bias the second element of the selected cell toward the predetermined one of said stable states, further means operative in non-time coincidence with said first means for applying a selection field to the second element of said selected cell, said second element responsive to the coincident application of the magnetic bias and selection field to switch to the predetermined one of said stable states, said first means including means for thereafter demagnetizing the first element of the selected cell to thereby inhibit any magnetic bias therefrom to the second element of the corresponding cell and the second element of an adjacent cell.

5. Apparatus for registering pulse information magnetically by the transmission of electrical impulses comprising, a plurality of storage cells arranged side by side in a given plane, each said cell comprising a first and a second planar element made of magnetic material exhibiting a uniaxial anisotropic characteristic defining a first and a second stable state of remanent flux orientation said elements arranged with their easy axes in substantial alignment so that a static field of one element in a remanent stable state couples adjacent elements, each said storage cell coupled with a plurality of windings, means for selectively applying a first impulse to first one of said windings to establish first element of one of said cells in a predetermined one of said first and second stable states thereby magnetically biasing the second element of said one cell toward the predetermined one of said stable states, said means including means for thereafter applying a second of said impulses to a second one of said windings and applying a selection field to the second element of said one cell, said second element of said one cell responsive to the coincidence of said bias and applied field to switch to the predetermined one of said stable states, said means including further means for thereafter applying a third one of said impulses in an opposite sense to the first one of said windings to demagnetize the first element of said one cell thereby inhibiting further magnetic bias to the second element of said one cell and a second element of an adjacent cell.

6. A circuit comprising a first and a second planar magnetic element, each made of material exhibiting an easy axis of magnetization defining a first and a second stable state of remanent flux orientation, said elements positioned in field coupling relationship with respect to one another, first means for establishing said first element in a predetermined one of said stable states to thereby magnetically bias said second element toward the predetermined one of said stable states, second means for thereafter applying a selection field to said second element, said second element responsive only to the coincidence of said bias and selection field to switch to the predetermined one of said stable states, said first means including third means for thereafter demagnetizing said first element whereby said magnetic bias is inhibited.

7. The circuit as set forth in claim 6, wherein said second means is operative in non-time coincident relationship with said first means.

8. The circuit as set forth in claim 7, wherein said third means is operative in non-time coincidence with said second means.

9. In a circuit, a first and a second planar magnetic element, each said magnetic element exhibiting an easy axis of magnetization defining a first and a second stable state of remanent flux orientation, said elements positioned in field coupling relationship with respect to one another, first means for establishing said first element in a predetermined one of said stable states to magnetically bias said second element toward said predetermined stable state, second means for thereafter applying a selection field to said second element, said second element responsive only to the coincidence of said bias and selection fields to switch to the predetermined one of said stable states, and means for thereafter demagnetizing said first element whereby said magnetic bias is inhibited.

10. The circuit of claim 9 wherein the magnetic material of said first element is of greater relative thickness than that of said second element.

11. In a circuit, a first and a second planar magnetic element, each said magnetic element exhibiting a uniaxial anisotropic characteristic defining opposite stable states of remanent flux orientation along an easy axis of magnetization, said elements defining a portion of a flux path only and positioned in field coupling relationship with respect to one another, means for establishing said first element in a predetermined one of said stable states to thereby magnetically bias said second element toward the predetermined one of said stable states, means for applying a selection field to the second element, said second element only responsive to the coincidence of both said bias and applied field to switch to the predetermined one of said stable states, and means applying a field to said first element directed transverse with respect to the easy axis thereof for demagnetizing said first element whereby the magnetic bias of said second element is inhibited.

12. In a circuit, a first and second element comprising a continuous film of magnetic material exhibiting a uniaxial anisotropic characteristic defining opposite stable states of remanent flux orientation along an easy axis of magnetization, first means for establishing said first element in a predetermined one of said stable states to thereby magnetically bias said second element toward the predetermined one of said stable states, second means operative in non-time coincidence with said first means for thereafter applying a selection field to said second element, said second element only responsive to the coincidence of said bias and selection fields to switch to the predetermined one of said stable states, and field applying means for thereafter rotating the magnetization of said first element 90° with respect to the easy axis thereof whereby said first element is demagnetized and the magnetic bias of said second element is inhibited.

13. The circuit of claim 12, wherein the magnetic material of said first element is of a greater relative thickness than that of said second element.

No references cited.